(12) United States Patent
Maeda et al.

(10) Patent No.: US 11,878,638 B2
(45) Date of Patent: Jan. 23, 2024

(54) VEHICLE

(71) Applicant: Yamaha Hatsudoki Kabushiki Kaisha, Shizuoka (JP)

(72) Inventors: Kenichi Maeda, Shizuoka (JP); Shinichiro Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 321 days.

(21) Appl. No.: 17/102,450

(22) Filed: Nov. 24, 2020

(65) Prior Publication Data

US 2021/0155172 A1    May 27, 2021

(30) Foreign Application Priority Data

Nov. 27, 2019  (JP) .................. 2019-214490

(51) Int. Cl.

| | |
|---|---|
| *B60R 13/08* | (2006.01) |
| *B60K 11/04* | (2006.01) |
| *B60K 5/00* | (2006.01) |
| *B60K 37/00* | (2006.01) |
| *B60R 19/02* | (2006.01) |
| *B60G 7/00* | (2006.01) |
| *B62D 21/11* | (2006.01) |
| *B60S 1/64* | (2006.01) |

(Continued)

(52) U.S. Cl.
CPC .......... *B60R 13/0869* (2013.01); *B60G 7/001* (2013.01); *B60G 13/00* (2013.01); *B60K 5/00* (2013.01); *B60K 11/04* (2013.01); *B60K 37/00* (2013.01); *B60N 2/00* (2013.01); *B60R 19/02* (2013.01); *B60S 1/64* (2013.01); *B62D 21/11* (2013.01)

(58) Field of Classification Search
CPC ..... B60R 13/0869; B60R 19/02; B60G 7/001; B60G 13/00; B60G 3/20; B60G 2200/144; B60G 2206/0114; B60K 5/00; B60K 11/04; B60K 37/00; B60K 5/04; B60K 2005/003; B60N 2/00; B60S 1/64; B62D 21/11; B62D 23/005
See application file for complete search history.

(56) References Cited

U.S. PATENT DOCUMENTS 1,520,212 A * 12/1924 Songer ................ F28D 1/05333
                                                           165/44
1,887,724 A * 11/1932 Sieweck ............. B62D 25/081
                                                           180/90

(Continued)

FOREIGN PATENT DOCUMENTS

| EP | 2500242 A1 | 9/2012 | |
|---|---|---|---|
| JP | H08113043 A | * 5/1996 | |
| WO | WO-2005100797 A1 | * 10/2005 | ............. B60K 11/04 |

*Primary Examiner* — James A Shriver, II
*Assistant Examiner* — Michael T. Walsh
(74) *Attorney, Agent, or Firm* — HEA LAW PLLC (57) ABSTRACT

A vehicle includes a radiator including a fan, a driving seat provided on a rear side of the radiator, a dashboard disposed on the rear side of the radiator and on a front side of the driving seat, and a heat shield plate disposed between the radiator and the dashboard. According to this structure, it is possible to prevent a device (for example, an electric component disposed on the dashboard) disposed on the rear side of the radiator from directly contacting air that receives heat of the radiator.

14 Claims, 9 Drawing Sheets

(51) Int. Cl.
*B60G 13/00* (2006.01)
*B60N 2/00* (2006.01)

(56) References Cited

U.S. PATENT DOCUMENTS

| | | | | |
|---|---|---|---|---|
| 5,689,953 | A * | 11/1997 | Yamashita | F01N 3/05 180/68.1 |
| 7,287,619 | B2 * | 10/2007 | Tanaka | B60K 13/02 180/908 |
| 10,189,428 | B1 * | 1/2019 | Sellars | B60R 19/34 |
| 2008/0207111 | A1 * | 8/2008 | Stroehla | B60H 1/00564 454/262 |
| 2012/0193163 | A1 | 8/2012 | Wimpfheimer et al. | |
| 2014/0209404 | A1 | 7/2014 | Deckard et al. | |
| 2019/0299737 | A1 * | 10/2019 | Sellars | B60G 3/225 |
| 2021/0339622 | A1 * | 11/2021 | Andre | B60K 11/085 |
| 2022/0032767 | A1 * | 2/2022 | Lissner | F01P 11/10 |

* cited by examiner

VEHICLE

CROSS-REFERENCE TO RELATED APPLICATION

The present application claims priority from Japanese application JP 2019-214490 filed on Nov. 27, 2019, the content of which is hereby incorporated by reference into this application.

Field of the Invention

This invention relates to a vehicle.

BACKGROUND OF THE INVENTION

Description of the Related Art

In vehicles, a dashboard including a speedometer, a tachometer, or the like is disposed frontward of a driving seat. Those vehicles are shown, for example, in the specifications of US Patent Application Publication No. US2012/0193163, the specification of US Patent Application Publication No. US2014/0209404, and the specification of European Patent Application Publication No. 2500242. In addition to the meters, a switch operated by a user and electric components such as a sensor may be disposed in the dashboard. A radiator for cooling the engine is located frontward of the dashboard, even if the engine is disposed behind the dashboard, for example, the engine is in a center portion of the vehicle body or in a rear portion of the vehicle body. In such a vehicle, air that receives heat of the radiator may reach a device (for example, an electric component disposed in the dashboard) located behind the radiator.

SUMMARY OF THE INVENTION (1) An example of a vehicle proposed in the disclosure includes: a radiator including a fan; a driving seat disposed rearward of the radiator; a dashboard disposed rearward of the radiator and frontward of the driving seat, and the dashboard including a meter; an engine unit at least a portion of which is located below a lower end of the driving seat, and which is disposed further rearward than a front end of the driving seat; and a heat shield plate disposed between the radiator and the dashboard. According to the vehicle, it is possible to prevent a device (for example, an electric component disposed on the dashboard) disposed rearward of the radiator from being heated by air that receives heat from the radiator, by using a simple structure.

(2) In the vehicle according to (1), in a side view of a vehicle body, the heat shield plate may be inclined to extend obliquely rearward and downward from an upper edge of the heat shield plate. Accordingly, the air that receives the heat of the radiator can be effectively prevented from flowing obliquely upward toward the dashboard.

(3) In the vehicle according to (1), the heat shield plate may include an area that is at least half of an area of the fan of the radiator in a front view of the vehicle. Accordingly, a sufficient area is secured in the heat shield plate, so that the air that receives the heat of the radiator can be effectively prevented from reaching the dashboard.

(4) In the vehicle according to (1), a distance from at least a part of the heat shield plate to the radiator may be equal to or less than a diameter of the fan of the radiator in a side view of the vehicle. In this structure, since the distance between the heat shield plate and the radiator does not become too large, the air that receives the heat of the radiator can be effectively prevented from reaching the dashboard.

(5) In the vehicle according to (4), the distance may be equal to or less than a radius of the fan of the radiator.

(6) In the vehicle according to (1), at least a part of the heat shield plate may be located higher than a rotation center of the fan of the radiator. Accordingly, the air that receives the heat of the radiator can be effectively prevented from flowing obliquely upward toward the dashboard.

(7) In the vehicle according to (1), the heat shield plate may overlap with a rotation center of the fan of the radiator in a front view of the vehicle. Accordingly, the air discharged rearward from the fan can be effectively shielded by the heat shield plate.

(8) The vehicle according to (1) may further include a vehicle body frame, and the heat shield plate may be attached on the vehicle body frame. Accordingly, the fixture strength of the heat shield plate can be sufficiently secured.

(9) The vehicle according to (8) may further include left and right front wheel suspension devices each including an arm supporting a front wheel so that the front wheels are vertically movable. Further, the vehicle body frame includes arm support portions to which a proximal portion of the arm of the right front wheel suspension device and a proximal portion of the arm of the left front wheel suspension device are connected, and left and right strut portions extending upward from the arm support portions. The heat shield plate may be attached on the left and right strut portions.

(10) In the vehicle according to (8), the vehicle body frame may include a cross portion disposed along an upper edge of the heat shield plate. Accordingly, the cross portion can also function as a part of a heat shield member.

(11) In the vehicle according to (1), a case is disposed frontward of the dashboard, and at least an upper portion of the heat shield plate may be located frontward of the case. Accordingly, since the air that receives the heat of the radiator collides with the heat shield plate before colliding with the case, the air that receives the heat of the radiator can be more effectively prevented from flowing toward the dashboard. In the vehicle according to (11), the case may be a case disposed frontward of the dashboard, a case of an air cleaner, a case of electric components, or the like.

(12) The vehicle according to (1) may further include: an air cleaner disposed frontward of the dashboard, the air cleaner including a case provided with an intake port to suck air through the intake port from the outside. The heat shield plate may be disposed between the radiator and the case. Accordingly, since the air that receives the heat of the radiator collides with the heat shield plate before colliding with the case, the air that receives the heat of the radiator can be more effectively prevented from flowing toward the dashboard.

(13) The vehicle according to (8) may further include a front wheel suspension device including a shock absorber. At least a part of the heat shield plate may be located further rearward than the shock absorber in a side view of the vehicle. Accordingly, it is possible to prevent the air that collides with the heat shield plate and flows leftward or rightward from colliding with the shock absorber.

(14) In the vehicle according to (1), a position of an upper end of the heat shield plate may be the same as a position of an upper end of the radiator, or lower than the upper end of the radiator and higher than a center of the fan of the radiator.

(15) The vehicle according to (1) may further include: an electric component located frontward of the dashboard; and a front case in which the electric component is disposed. The heat shield plate may be located below the front case in a side view of a vehicle body. Accordingly, it is possible to prevent the electric component disposed in the front case from being warmed by the air that receives the heat of the radiator.

(16) The vehicle according to (1) may further include: a front wheel; and a front fender that covers the front wheel. At least a part of the heat shield plate may be located between the front fender and the front wheel in a side view of a vehicle body. Accordingly, the air that collides with the heat shield plate can smoothly flow to the outside of the vehicle body from between the front fender and the front wheel.

DETAILED DESCRIPTION OF THE INVENTION

Hereinafter, a vehicle proposed in the disclosure will be described. The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

In this specification, as an example of the vehicle, a four-wheel vehicle 1 shown in FIG. 1 and the like will be described. The vehicle 1 is an all-terrain vehicle (ATV), a side-by-side vehicle, a utility vehicle, a recreational off-highway vehicle, or the like, which is relatively frequently used on uneven ground. The present disclosure is to be considered as an exemplification of the invention, and is not intended to limit the invention to the specific embodiments illustrated by the figures or description below.

Figure 3A:
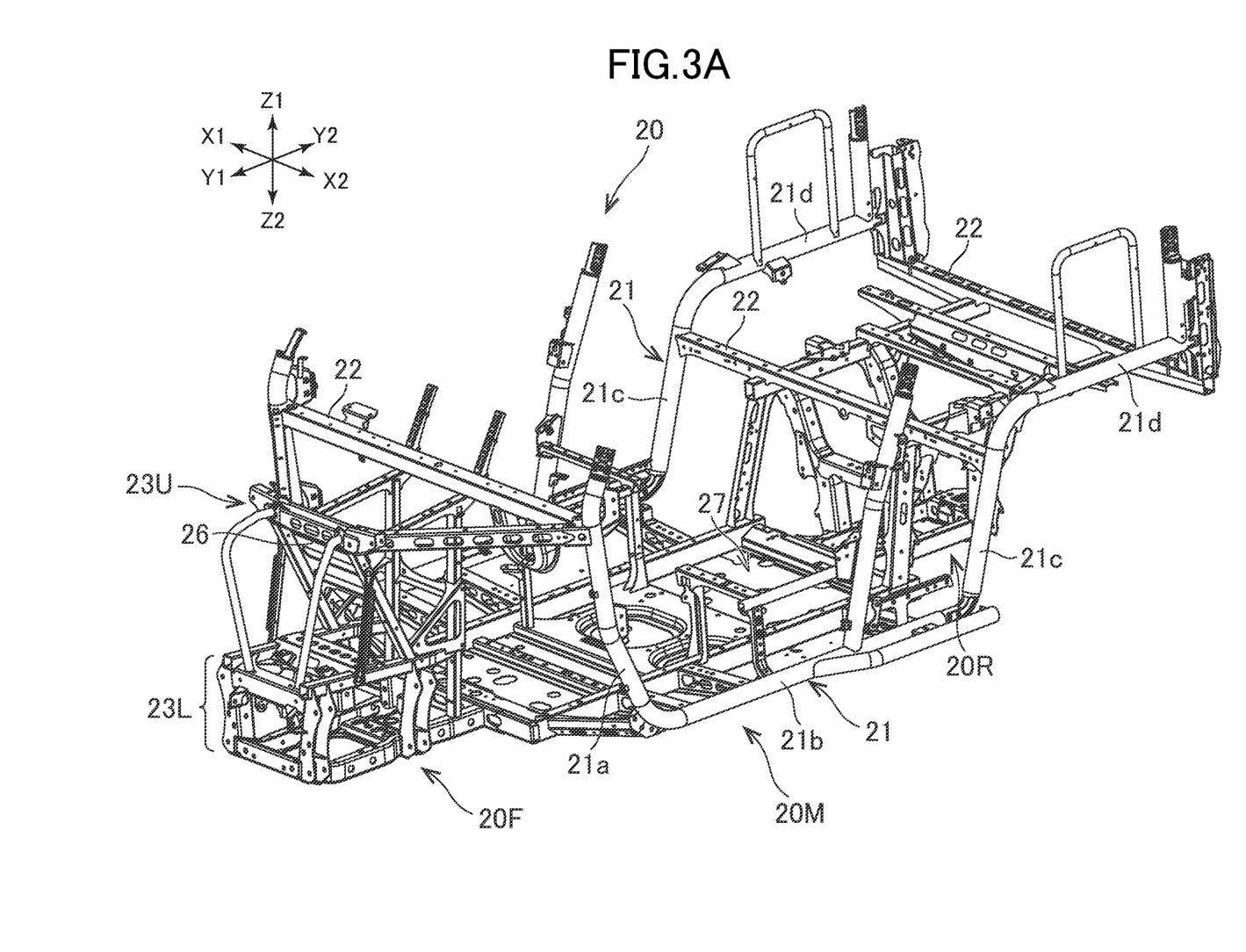
FIG. 3A is a perspective view of the vehicle body frame.

In the following description, in FIG. 1 and the like, directions indicated by Z1 and Z2 are respectively referred to as the upward direction and the downward direction, and directions indicated by Y1 and Y2 are respectively referred to as the frontward direction and the rearward direction. Further, directions indicated by X1 and X2 in FIG. 3A are respectively referred to as the rightward direction and the leftward direction, and a direction indicated by X1-X2 is referred to as a vehicle width direction or a left-right direction.

[Outline of Vehicle]

Figure 1:
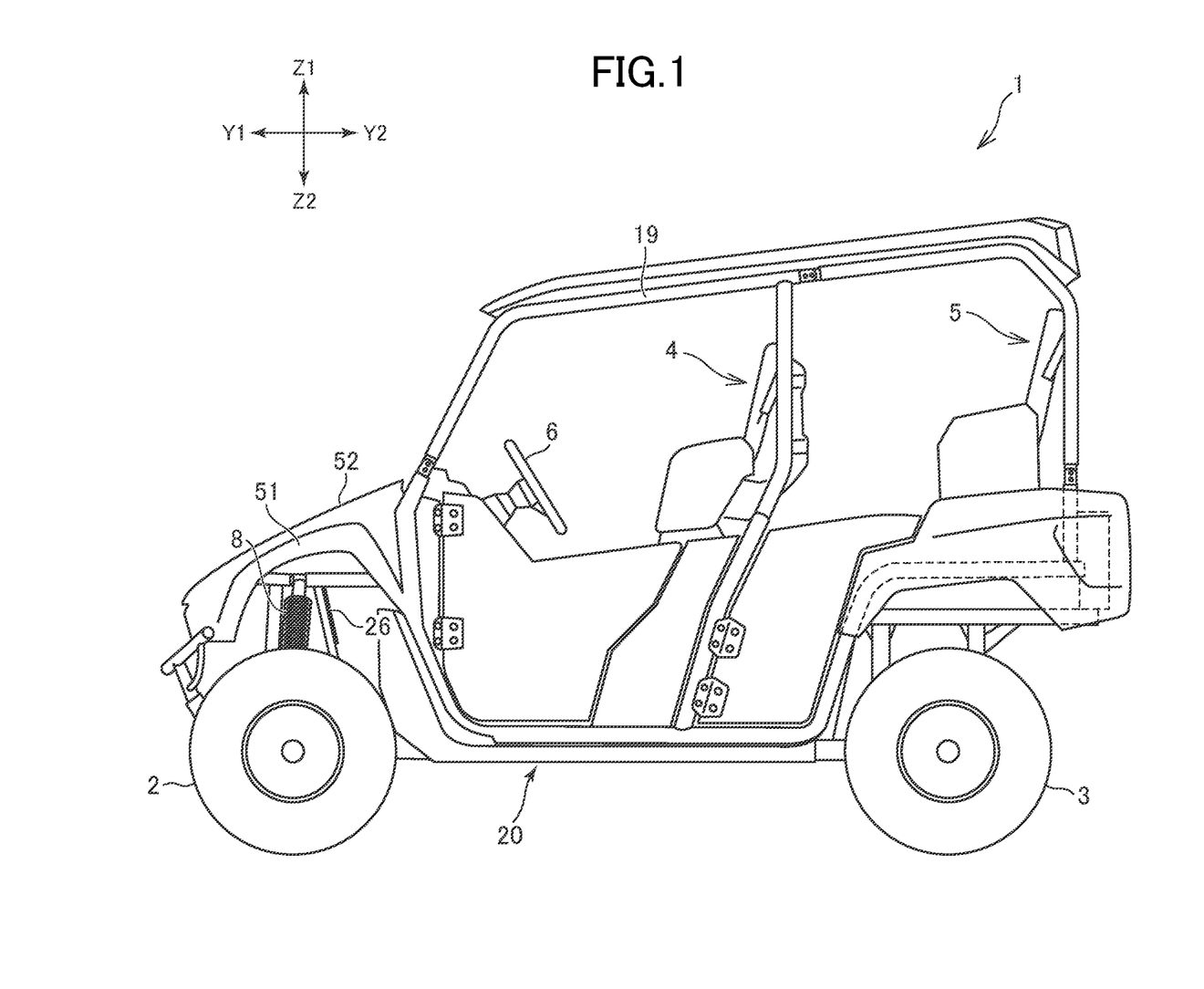
FIG. 1 is a side view showing an example of a vehicle proposed in the disclosure.

As shown in FIG. 1, the vehicle 1 includes left and right front wheels 2 and left and right rear wheels 3. Further, the vehicle 1 also includes left and right front seats 4 and left and right rear seats 5 disposed rearward of the front seats 4.

The left front seat 4 is a driving seat, and a steering wheel 6 for steering the front wheels 2 is disposed frontward of the left front seat 4. Further, a dashboard 11 (see FIG. 2) is disposed frontward of the front seat 4.

A plurality of electric components is disposed on the dashboard 11. An example of the electric components are meters 12 (see FIG. 5). The meters 12 include, for example, a speedometer and a tachometer that indicates a rotation speed of an engine. The dashboard 11 may be provided with a display device 13 (see FIG. 6), a switch (for example, an engine start switch) for a user to operate, and the like. The steering wheel 6 may be electric power steering. In this case, an electric motor is mounted on a steering shaft connected to the steering wheel 6. The electric motor is disposed on an inner side of the dashboard 11 (that is, on a front side of the dashboard 11). A sensor for detecting a rotational position of the steering wheel 6 may be provided to the electric motor. The vehicle 1 includes a heat shield plate 26 for preventing these electric components from being warmed by air that receives heat of a radiator 31. The radiator 31 and the heat shield plate 26 will be described later in detail.

The number and arrangement of the seats is not limited to the example of the vehicle 1. The vehicle 1 may have, as the front seat 4, only a driving seat disposed in a center of a vehicle body in the left-right direction. Further, the vehicle 1 may not have the rear seats 5.

Figure 2:
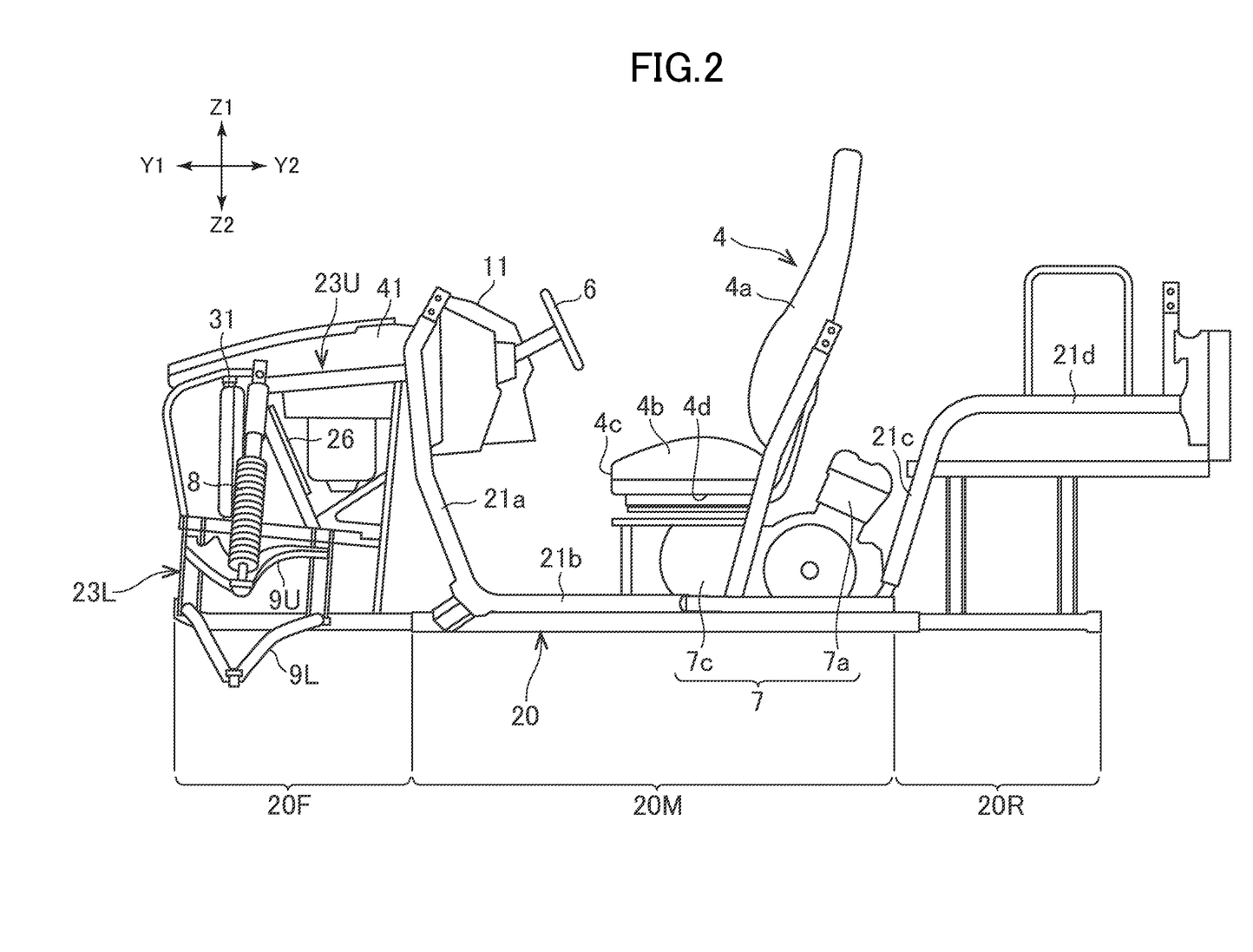
FIG. 2 is a side view showing components such as a vehicle body frame, an engine unit, and a front wheel suspension device included in the vehicle.

As shown in FIG. 2, the vehicle 1 includes an engine unit 7 including an engine 7a and a transmission 7c. The engine 7a includes a crankcase, a cylinder, and the like. Power of the engine unit 7 (power received from the transmission 7c) is transmitted to both or one of the front wheels 2 and the rear wheels 3 through a propeller shaft (not shown).

As shown in FIG. 2, the engine unit 7 is located further rearward than a front end 4c of the front seat 4 in a side view of the vehicle body. In the example shown as the vehicle 1, the engine unit 7 is located on a substantially center portion of the vehicle body in a front-rear direction, and the entire engine unit 7 is located further rearward than the front end 4c of the front seat 4. A part of the engine unit 7 is located between the left and right front seats 4 in a plan view of the vehicle body. The engine unit 7 includes the engine 7a at a rear portion thereof and the transmission 7c at a front portion thereof. The transmission 7c is disposed between the left and right front seats 4.

As shown in FIG. 2, at least a part of the engine unit 7 is located lower than a lower end 4d of the front seat 4 in the side view of the vehicle body. For example, the transmission 7c is located lower than the lower end 4d of a seat bottom 4b of the front seat 4. The seat bottom 4b is located at a bottom portion of the front seat 4, and is a portion having a seating surface on which an occupant sits. The front seat 4 includes a seat back 4a disposed on a rear side of the seat bottom 4b.

[Vehicle Body Frame]

As shown in FIG. 2, a vehicle body frame 20 includes a frame center portion 20M supporting the front seats 4 and the engine unit 7, a frame rear portion 20R located rearward of the frame center portion 20M and disposed between the left and right rear wheels 3, and a frame front portion 20F located frontward of the frame center portion 20M and disposed between the left and right front wheels 2. A roll cage 19 (see FIG. 1) that covers the seats 4 and 5 is mounted on the vehicle body frame 20.

As shown in FIG. 3A, the frame center portion 20M has extending portions 21 on a right part and a left part thereof. The extending portion 21 includes a center portion 21b located at a lower portion of the frame center portion 20M and extending in the front-rear direction, a front strut portion 21a extending obliquely upward from a front portion of the center portion 21b, and a rear strut portion 21c extending obliquely upward from a rear portion of the center portion 21b. The extending portion 21 has a rear extending portion 21d extending rearward from an upper portion of the rear strut portion 21c. A plurality of cross portions 22 are stretched over the left and right extending portions 21. The frame center portion 20M has a bottom portion 27 between the left and right extending portions 21 (more specifically, between the left and right center portions 21b). The engine unit 7 and the front seats 4 are supported on the bottom portion 27.

A shock absorber (not shown) supporting the rear wheel 3 and an arm (not shown in the figures) capable of vertically moving the rear wheel 3 are connected to the frame rear portion 20R.

A front wheel suspension device supporting the front wheel 2 is connected to the frame front portion 20F. The front wheel suspension device includes arms 9U and 9L (see FIG. 2) that connect the front wheel 2 and the frame front portion 20F, and a shock absorber 8 (see FIG. 2) that buffers the vertical movement of the front wheel 2. As shown in FIG. 3A, the frame front portion 20F has an upper portion 23U and an arm support portion 23L formed on a lower side of the upper portion 23U. The arm support portion 23L includes arm connecting portions 23a and 23b (see FIG. 3B). The proximal portions of two arms 9U and 9L are vertically separated from each other and connected to the arm connecting portions 23a and 23b, respectively. A lower end of the shock absorber 8 is connected to the upper arm 9U. An upper end of the shock absorber 8 is connected to a support portion 23c formed on the upper portion 23U of the frame front portion 20F.

[Radiator]

Figure 4A:
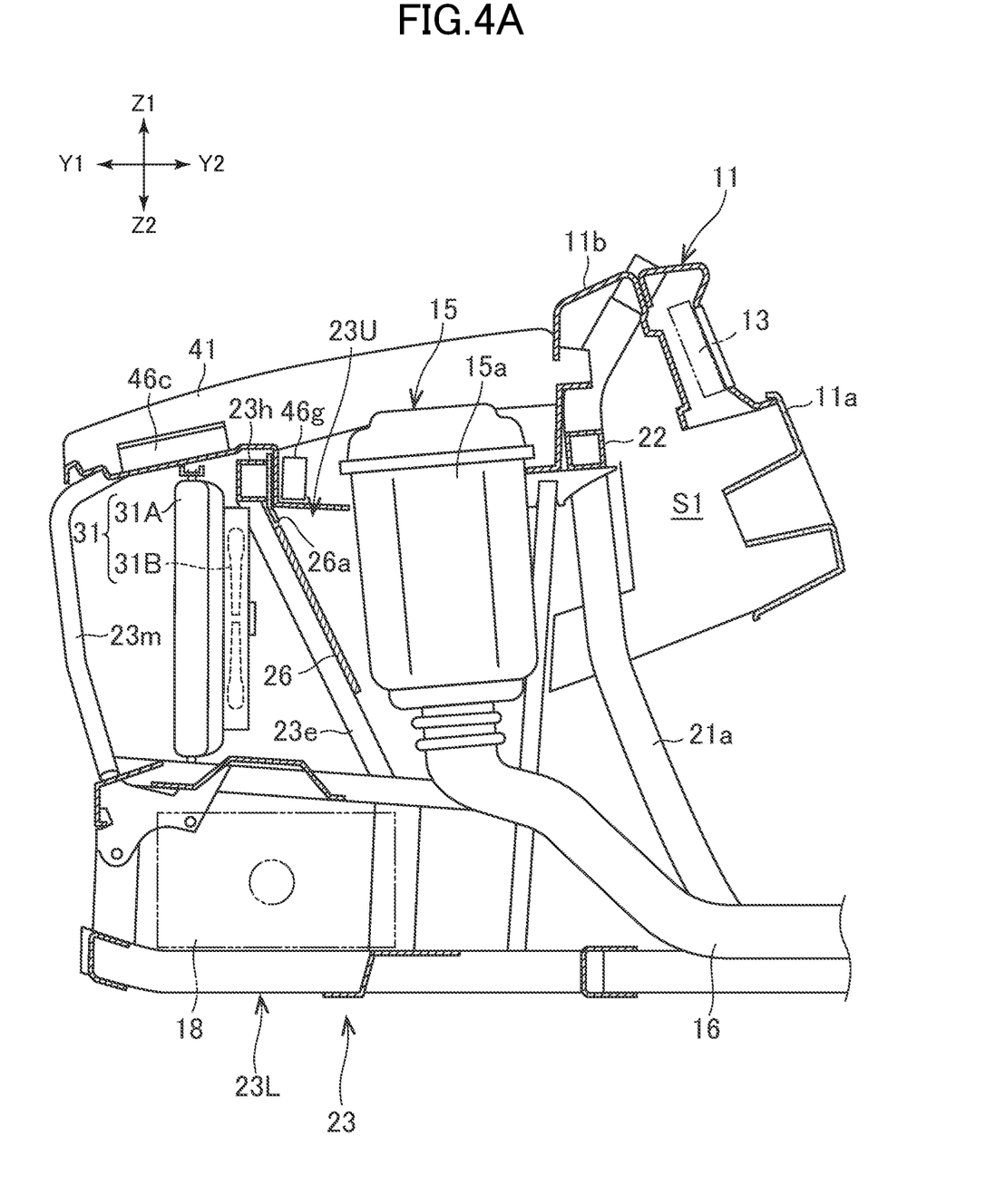
FIG. 4A is a cross-sectional view of a front portion of a vehicle body, which is obtained by a cross section passing through a center of the vehicle body in a left-right direction.

The engine 7a is a water-cooled engine, and the vehicle 1 includes the radiator 31 for releasing heat of a cooling liquid that passes through the engine 7a. The radiator 31 and the engine 7a are connected by a pipe (not shown in the figures) through which the cooling liquid passes. As shown in FIG. 4A, the radiator 31 is disposed on the upper side of the arm support portion 23L, and is attached to the upper portion 23U. The radiator 31 is arranged to face the front of the vehicle body. The radiator 31 includes a main body 31A including a flow path through which the cooling liquid passes, and also includes a fan 31B. In the example shown as the vehicle 1, the fan 31B is mounted on the rear side of the main body 31A. When the fan 31B is driven, air is discharged rearward. Hereinafter, the fan 31B is referred to as a "radiator fan". The main body 31A is referred to as a "radiator main body".

[Heat Shield Plate]

The dashboard 11 is located rearward of the radiator 31. As shown in FIG. 4A, the heat shield plate 26 is disposed between the radiator 31 and the dashboard 11. The heat shield plate 26 prevents air that receives the heat of the radiator 31 from heading to the dashboard 11. In other words, the heat shield plate 26 guides the air that receives the heat of the radiator 31 in a direction different from a direction toward the dashboard 11.

As shown in FIG. 4A, there are no other devices, members, components, or portions between the heat shield plate 26 and the radiator 31, except for a strut portion 23e described later on which the heat shield plate 26 is attached. Therefore, the air that receives the heat of the radiator 31 directly collides with the heat shield plate 26.

A part of the air that collides with the heat shield plate 26 flows to the right side and the left side of the vehicle body. Therefore, it is desirable that at least a part of the heat shield plate 26 is exposed in the side view of the vehicle body as shown in FIG. 1. That is, it is desirable that the vehicle 1 does not include a vehicle body cover that is located on, and covers, the right side and the left side of the heat shield plate 26. Thus, the air that collides with the heat shield plate 26 smoothly flows to the outside of the vehicle body. In an example, the entire heat shield plate 26 is exposed in the side view of the vehicle body. In another example, a part (for example, an upper part) of the heat shield plate 26 is exposed in the side view of the vehicle body.

As shown in FIG. 1, the vehicle 1 includes a front fender 51 that covers an upper side and a rear side of the front wheel 2. At least a part of the heat shield plate 26 is located between the front wheel 2 and the front fender 51 in the side view of the vehicle body. Then, the at least a part of the heat shield plate 26 is exposed between the front wheel 2 and the front fender 51. The air that collides with the heat shield plate 26 flows to the outside of the vehicle body from between the front fender 51 and the front wheel 2. In the example shown as the vehicle 1, the entire heat shield plate 26 is exposed between the front wheel 2 and the front fender 51. A layout of the heat shield plate 26 is not limited to the example of the vehicle 1. The heat shield plate 26 may partially overlap the front wheel 2 in the side view of the vehicle body.

As shown in FIG. 2, at least a rear portion of the heat shield plate 26 is located rearward of the shock absorber 8 in the side view of the vehicle. Therefore, the air that collides with the heat shield plate 26 and flows to the right side or the left side of the vehicle body smoothly flows to the outside of the vehicle body without colliding with the shock absorber 8. In the example shown as the vehicle 1, the entire heat shield plate 26 is located rearward of the shock absorber 8. Unlike the vehicle 1, a front end (an upper end) of the heat shield plate 26 may overlap with the shock absorber 8, and only a rear portion (a lower portion) of the heat shield plate 26 may be located rearward of the shock absorber 8.

In the example shown as the vehicle 1, the heat shield plate 26 is a substantially parallel plate in the left-right direction of the vehicle body. Unlike the example shown as the vehicle 1, the heat shield plate 26 may be curved to make the air flow smoother. For example, the heat shield plate 26 may be formed in a V shape that opens toward the rear side, or may be formed in a U shape that opens toward the rear side.

The dashboard 11 is located between the radiator 31 and the front seat 4 (driving seat). As shown in FIG. 4A, the dashboard 11 includes a main wall portion 11$a$ facing the front seat 4, and an upper wall portion 11$b$ extending forward from an upper portion of the main wall portion 11$a$. Each of the main wall portion 11$a$ and the upper wall portion 11$b$ may be formed by a plurality of members combined with each other. Since the air flow from the radiator 31 toward the rear side is blocked by the heat shield plate 26, the air that receives the heat of the radiator 31 can be prevented from accumulating in a space S1 (see FIG. 4A) that is formed on the lower side of the upper wall portion 11$b$ and on the front side of the main wall portion 11$a$.

Various electric components are disposed on the front side of the main wall portion 11$a$ (radiator 31 side) and on the lower side of the upper wall portion 11$b$. Since the air flow from the radiator 31 toward the rear side is blocked by the heat shield plate 26, the electric components can be prevented from being warmed by the air that receives the heat of the radiator 31. For example, a substrate of the meter 12, the display device 13, the switch, the sensor mounted on the electric motor that moves the steering shaft, and the like are disposed on the front side of the main wall portion 11$a$. The heat shield plate 26 can prevent these electric components from being warmed.

These electric components may not be attached on the dashboard 11. In other words, an electric component, which is located on the front side of the dashboard 11 and on the lower side of a front case 41 described later, may be attached on a component (for example, the frame front portion 20F) different from the dashboard 11, and may be prevented from being warmed by the heat shield plate 26.

Figure 3B:
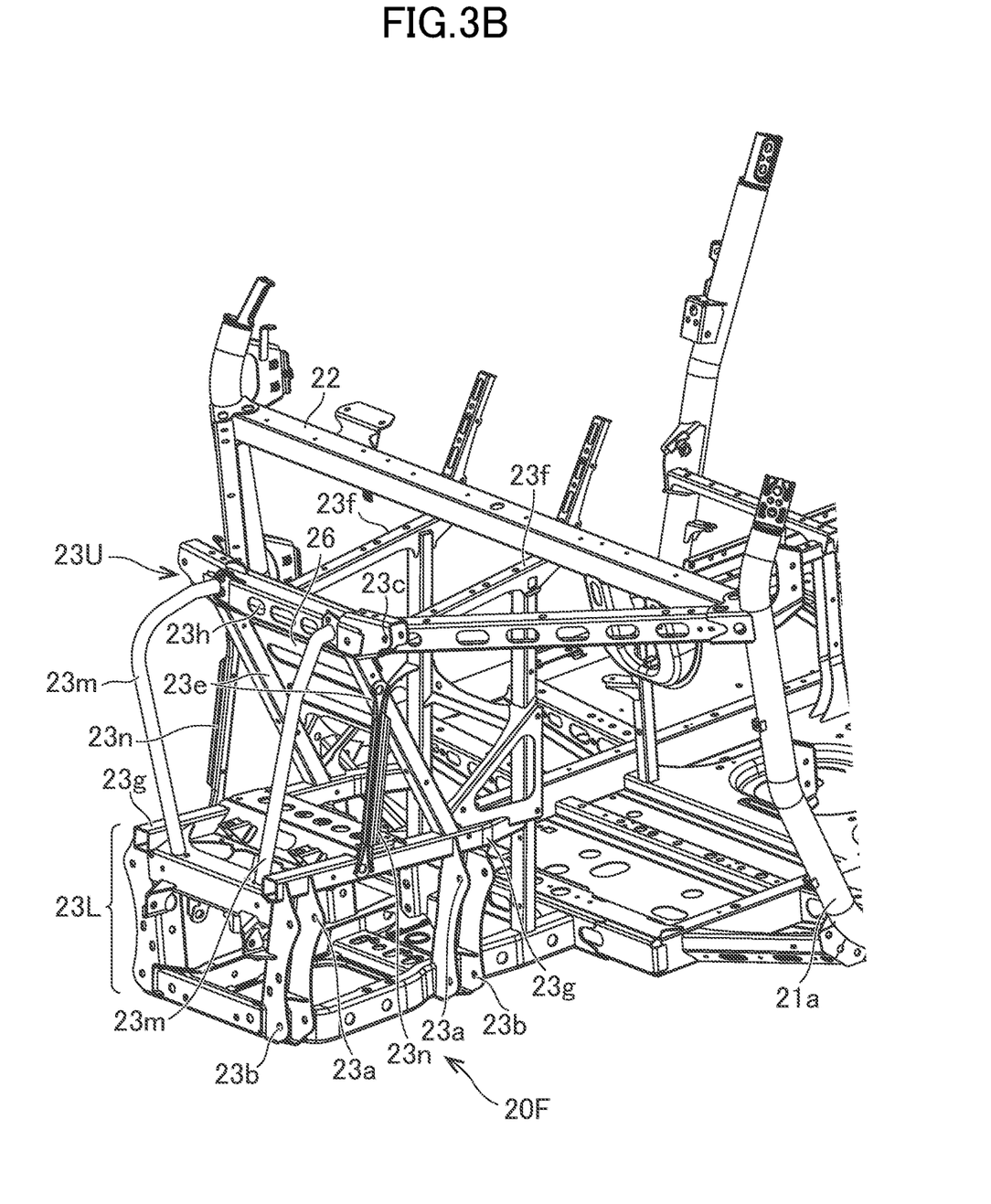
FIG. 3B is an enlarged view of the front part of FIG. 3A.

The heat shield plate 26 is attached to the vehicle body frame 20. Therefore, a fixture strength of the heat shield plate 26 can be sufficiently secured. In the example shown as the vehicle 1, as shown in FIG. 3B, the heat shield plate 26 is attached on the upper portion 23U of the frame front portion 20F. The upper portion 23U of the frame front portion 20F includes the left and right strut portions 23$e$ extending upward from the arm support portion 23L and separated in the left-right direction. A right portion and a left portion of the heat shield plate 26 are mounted on the right strut portion 23$e$ and the left strut portion 23$e$, respectively.

As shown in FIG. 3B, the frame front portion 20F includes left and right beam portions 23$f$ disposed along the front-rear direction at the uppermost portion of the frame front portion 20F. The arm support portion 23L of the frame front portion 20F also includes left and right beam portions 23$g$ disposed along the front-rear direction. The strut portion 23$e$ extends upward from the beam portion 23$g$ on the lower side and is connected to the beam portion 23$f$ at the uppermost portion.

The heat shield plate 26 is made of, for example, metal. In this case, the heat shield plate 26 may be welded to the left and right strut portions 23$e$, or may be fixed to the left and right strut portions 23$e$ with a fastener, such as a screw. The heat shield plate 26 made of metal can be used as a member that improves the rigidity of the frame front portion 20F. The heat shield plate 26 may be formed with a recess portion or a protrusion portion extending in a vertical direction or a horizontal direction, which improves the rigidity of the heat shield plate 26. As a result, the rigidity of the frame front portion 20F can also be improved. In the example shown as the vehicle 1 in FIG. 7, the heat shield plate 26 includes recess portions 26$g$ extending in the horizontal direction. Unlike the example of the vehicle 1, the heat shield plate 26 may be made of resin.

As shown in FIG. 4A, the frame front portion 20F has an upper cross portion 23$h$ extending in the left-right direction at the uppermost portion of the frame front portion 20F. In the example shown as the vehicle 1, the upper cross portion 23$h$ is fixed to the frontmost portions of the left and right beam portions 23$f$ (see FIG. 3B). The upper cross portion 23$h$ is disposed along an upper edge 26$a$ of the heat shield plate 26. According to this structure, the upper cross portion 23$h$ together with the heat shield plate 26 prevents the air that receives the heat of the radiator 31 from flowing toward the dashboard 11. That is, the upper cross portion 23$h$ can function as a part of a heat shield member.

Figure 4B:
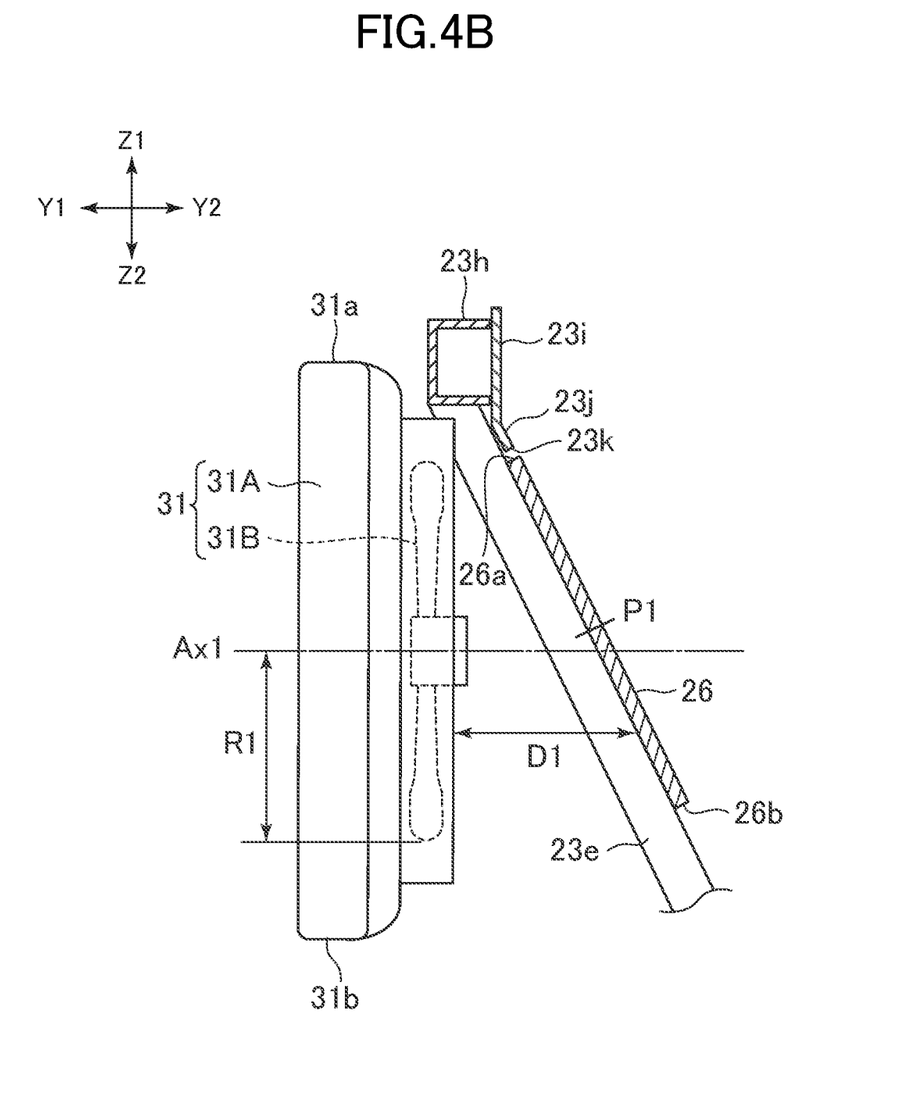
FIG. 4B is a side view showing a relative position of a heat shield plate, a cross portion, and a radiator shown in FIG. 4A.

As shown in FIG. 4B, in the example shown as the vehicle 1, the upper cross portion 23$h$ includes a plate 23$i$. The plate 23$i$ is fixed to, for example, a back surface of the upper cross portion 23$h$. The plate 23$i$ extends downward beyond a lower surface of the upper cross portion 23$h$, and has a portion 23$j$ extending along the left and right strut portions 23$e$. A lower edge 23$k$ of the portion 23$j$ is along the upper edge 26$a$ of the heat shield plate 26. Due to the presence of the plate 23$i$, the air that receives the heat of the radiator 31 can be more effectively prevented from flowing toward the dashboard 11.

As shown in FIG. 4B, the lower edge 23$k$ of the plate 23$i$ is lower than an upper end 31$a$ of the radiator 31. Due to the presence of the plate 23$i$, the air that receives the heat of the radiator 31 can be further effectively prevented from flowing toward the dashboard 11. In the example shown as the vehicle 1, the upper cross portion 23$h$ is located higher than the radiator 31. More specifically, the upper cross portion 23$h$ is located higher than the radiator fan 31B which is located at a rear portion of the radiator 31.

As shown in FIG. 4A, the radiator 31 is also attached on the frame front portion 20F. The upper portion 23U of the frame front portion 20F includes left and right front strut portions 23$m$ located frontward of the beam portions 23$f$. The radiator 31 is disposed between, and mounted on, the front strut portions 23$m$ and an upper surface of the arm support portion 23L.

[Relative Position Between Heat Shield Plate and Radiator]

As shown in FIG. 4A, the dashboard 11 is offset upward with respect to the radiator 31. In other words, a center of the dashboard 11 in an upper-lower direction is located higher than a center of the radiator 31 in the upper-lower direction (a center line Ax1 of the radiator fan 31B). Therefore, it is desirable that at least a part of the heat shield plate 26 is located higher than the center line Ax1 of the radiator fan 31B. Thus, the air that receives the heat of the radiator 31 can be effectively prevented from flowing toward the dashboard 11.

Figure 6:
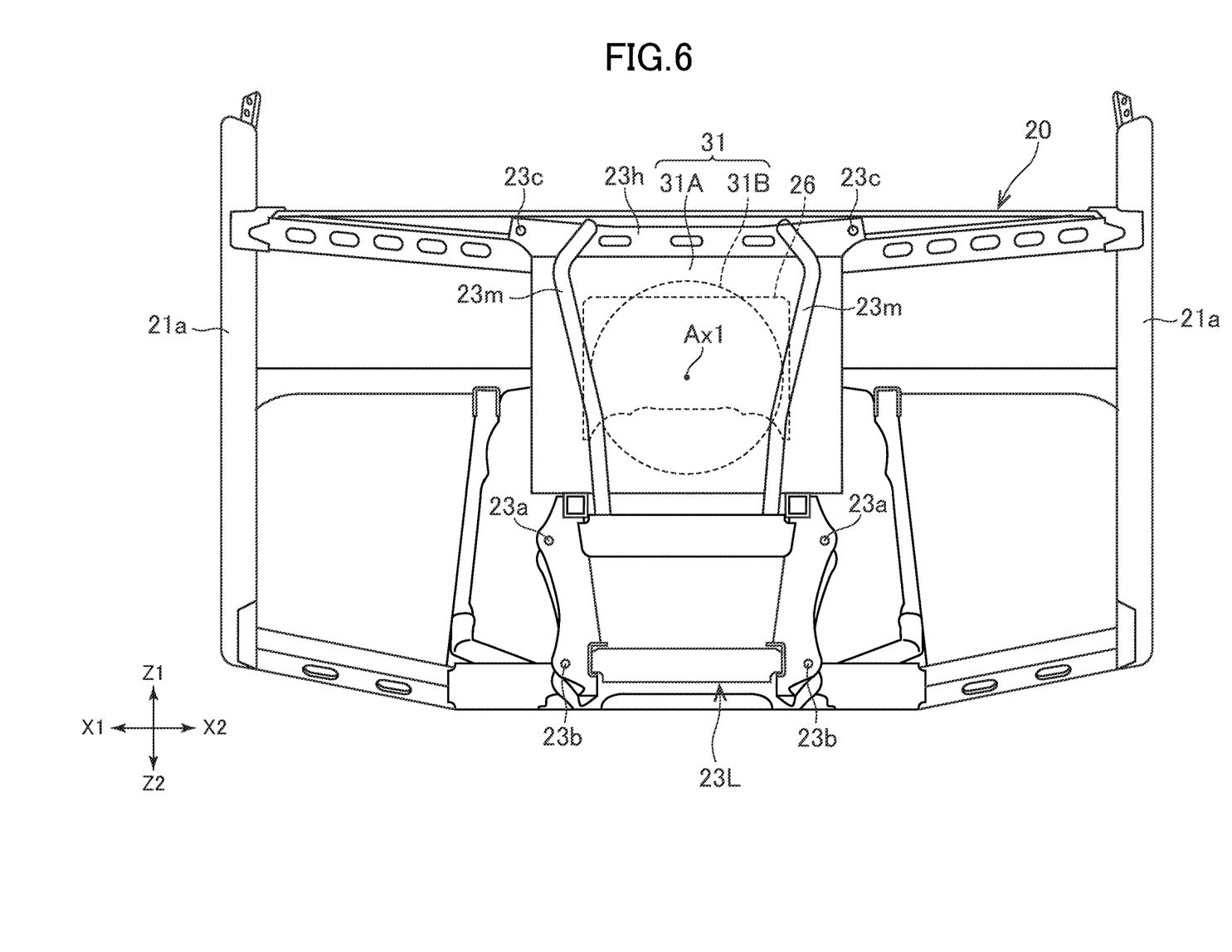
FIG. 6 is a front view of the radiator and the vehicle body frame.

As shown in FIG. 6, the heat shield plate 26 overlaps with a rotation center (center line Ax1) of the radiator fan 31B in a front view of the vehicle. According to this arrangement of the heat shield plate 26, air discharged rearward from the radiator fan 31B can be effectively shielded by the heat shield plate 26.

As shown in FIG. 4B, a position of the upper edge 26a of the heat shield plate 26 is lower than a position of the upper end 31a of the radiator 31, and higher than the center line Ax1 of the radiator fan 31B. On the other hand, a position of a lower edge 26b of the heat shield plate 26 is higher than a lower end 31b of the radiator 31, and lower than the center line Ax1 of the radiator fan 31B.

The heat shield plate 26 is arranged obliquely with respect to the upper-lower direction of the vehicle 1. Specifically, as shown in FIG. 4B, the heat shield plate 26 is inclined to extend obliquely rearward and downward from the upper edge 26a thereof. According to this arrangement of the heat shield plate 26, the air that collides with the heat shield plate 26 easily flows downward. As described above, the dashboard 11 is offset upward with respect to the radiator 31. By disposing the heat shield plate 26 obliquely, the air that receives the heat of the radiator 31 can be effectively prevented from flowing toward the dashboard 11.

As described above, the heat shield plate 26 is attached on the strut portions 23e (see FIG. 3B). As shown in FIG. 4A, the strut portions 23e also extend obliquely rearward and downward from the upper ends thereof. As shown in FIG. 3B, the frame front portion 20F may have reinforcing portions 23n that extend obliquely forward and downward from upper portions of the strut portions 23e and are connected to the arm support portion 23L. According to this structure, the strength and rigidity of the frame front portion 20F against a force in the upper-lower direction can be improved.

As shown in FIG. 4B, the heat shield plate 26 is offset upward with respect to the radiator 31. That is, a center P1 of the heat shield plate 26 in the upper-lower direction is located higher than the center of the radiator 31 in the upper-lower direction (the center line Ax1 of the radiator fan 31B). According to this layout of the heat shield plate 26, the air discharged rearward from a lower portion of the radiator 31 can easily pass below the heat shield plate 26 and below the vehicle body. In the example shown as the vehicle 1, the position of the lower edge 26b of the heat shield plate 26 is higher than the lower end 31b of the radiator 31. The position of the lower edge 26b of the heat shield plate 26 may be higher than a lower end of the radiator fan 31B.

Figure 7:
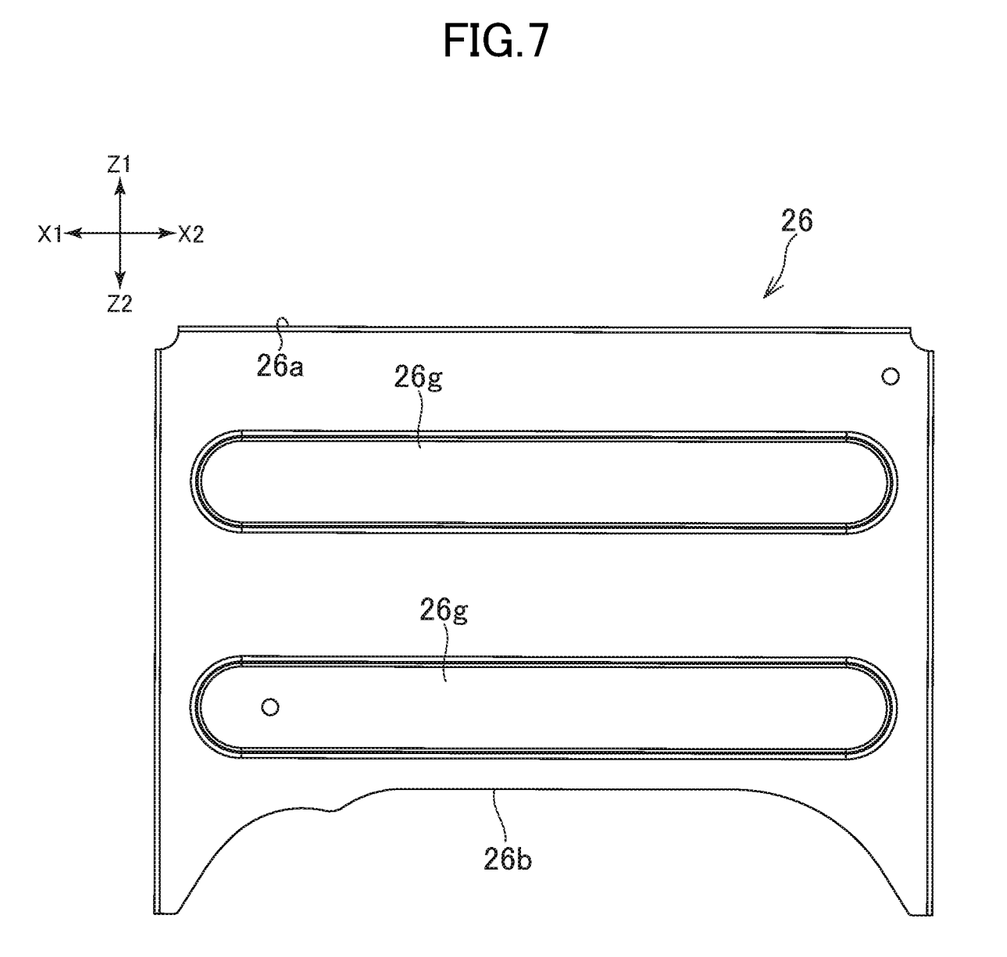
FIG. 7 is a front view of the heat shield plate.

As shown in FIG. 7, the lower edge 26b of the heat shield plate 26 is curved to be recessed upward. According to this shape of the heat shield plate 26, air can easily pass below the heat shield plate 26 and below the vehicle body.

The heat shield plate 26 preferably includes an area (size) that is at least half of an area of the radiator fan 31B in the front view of the vehicle. Thus, a sufficient area is secured in the heat shield plate 26, so that the air that receives the heat of the radiator 31 can be effectively prevented from reaching the dashboard 11. In this explanation, the area of the radiator fan 31B is an area of a locus drawn by each fin of the fan 31B rotating around the center line Ax1 of the radiator 31B.

As shown in FIG. 6, a center of the heat shield plate 26 in the left-right direction and a center of the radiator 31 in the left-right direction coincide with each other. Further, a size of the heat shield plate 26 in the left-right direction is larger than a size of the radiator fan 31B in the left-right direction (a diameter of the radiator fan 31B). Therefore, the air discharged rearward from the radiator fan 31B can be effectively prevented from reaching the dashboard 11. The size of the heat shield plate 26 in the left-right direction may be substantially the same as a size of the radiator 31 in the left-right direction. The size of the heat shield plate 26 in the left-right direction may be smaller than a size of the radiator main body 31A in the left-right direction.

As shown in FIG. 4B, in a side view of the vehicle body, a distance D1 from at least a part of the heat shield plate 26 to the radiator 31 is smaller than the diameter (R1×2) of the radiator fan 31B. (A symbol R1 in FIG. 4B is a radius of the radiator fan 31B. In the description here, the distance from the heat shield plate 26 to the radiator 31 is a length of a straight line along the front-rear direction connecting the heat shield plate 26 and a back surface of the radiator 31.) As described above, in the example shown as the vehicle 1, the heat shield plate 26 is obliquely arranged, and a distance between the upper edge 26a and the radiator 31 is smaller than a distance between the lower edge 26b and the radiator 31. Not only the distance between the upper edge 26a and the radiator 31 but also the distance between the lower edge 26b and the radiator 31 is smaller than the diameter of the radiator fan 31B. According to this arrangement of the heat shield plate 26, it is possible to effectively prevent a case where the air that receives the heat of the radiator 31 flows toward the dashboard 11 since the distance between the heat shield plate 26 and the radiator 31 is not too large.

In the example shown as the vehicle 1, the distance from the upper edge 26a of the heat shield plate 26 to the radiator 31 is smaller than the radius R1 of the radiator fan 31B. On the other hand, the distance from the lower edge 26b of the heat shield plate 26 to the radiator 31 is larger than the radius R1 of the radiator fan 31B.

Unlike the vehicle 1, the distance from the lower edge 26b of the heat shield plate 26 to the radiator 31 may be smaller than the radius R1 of the radiator fan 31B. Unlike this, both the distance from the upper edge 26a of the heat shield plate 26 to the radiator 31 and the distance from the lower edge 26b to the radiator 31 may be larger than the radius R1 of the radiator fan 31B.

The size of the heat shield plate 26 is not limited to the example of the vehicle 1. For example, a size of the heat shield plate 26 in the upper-lower direction may be coincident with a size of the radiator 31 or the radiator fan 31B in the upper-lower direction. Further, the size of the heat shield plate 26 in the left-right direction may be coincident with the size of the radiator 31 or the radiator fan 31B in the left-right direction.

[Front Case, Air Cleaner, and Heat Shield Plate]

Figure 5:
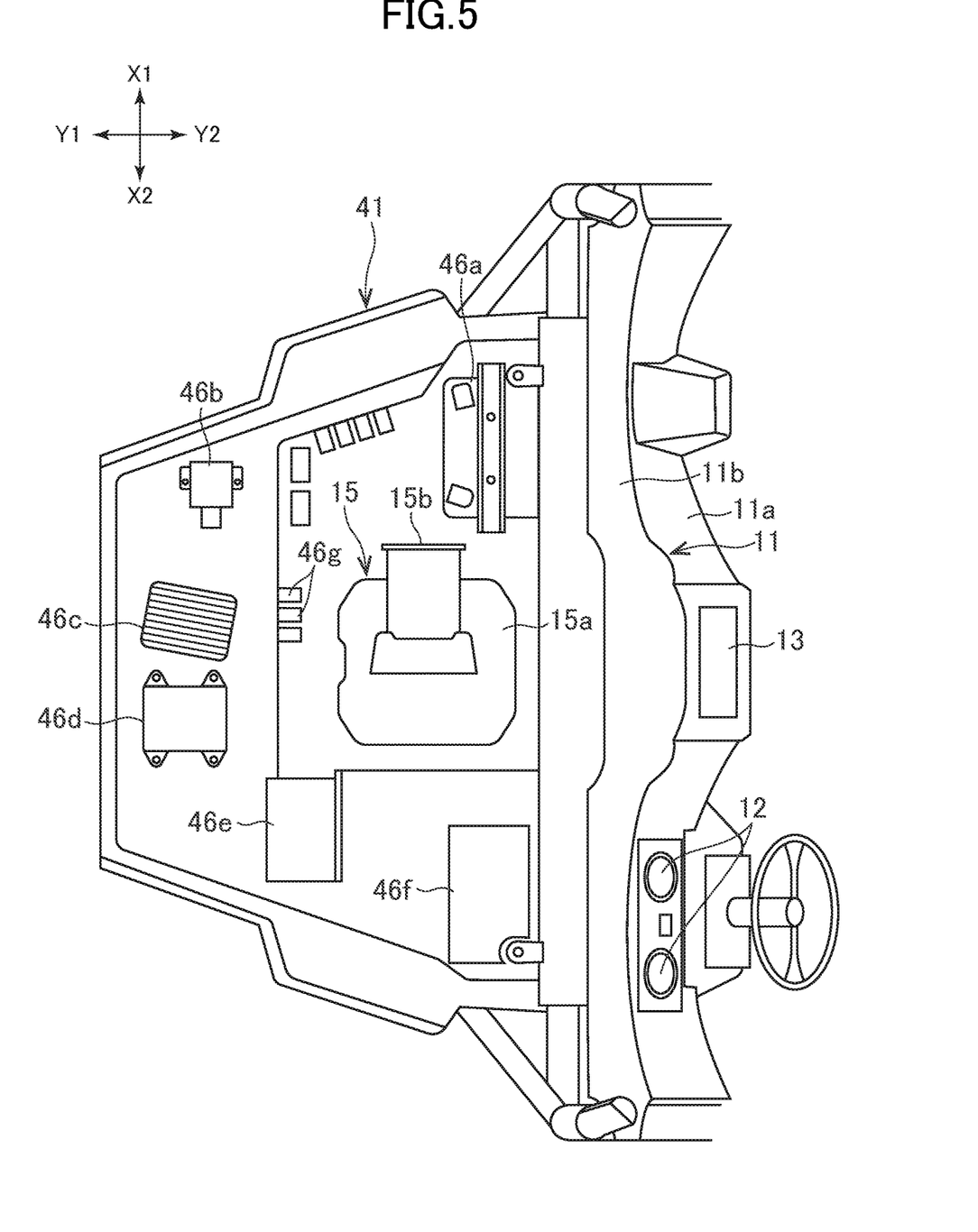
FIG. 5 is a plan view of a front case and a dashboard.

As shown in FIG. 5, the front case 41 is disposed on the front side of the upper wall portion 11b of the dashboard 11. The front case 41 houses various electric components 46a to 46g. The electric components 46a to 46g include, for example, a battery and a regulator. The front case 41 is disposed above, and supported by, the frame front portion 20F. The front case 41 is covered with a front cover 52 (see FIG. 1) disposed on the front side of the upper wall portion 11b of the dashboard 11.

As shown in FIG. 4A, an air cleaner 15 for cleaning air to be supplied to the engine 7a is disposed frontward of the dashboard 11. The air cleaner 15 includes a filter and an air cleaner case 15a that houses the filter. A lower portion of the air cleaner case 15a is located below the front case 41. An intake duct 16 that connects the air cleaner case 15*a* and the engine 7*a* is connected to the lower portion of the air cleaner case 15*a*.

The air cleaner case 15*a* includes an intake port 15*b* (see FIG. 5) at an upper portion thereof. An opening is formed in the front case 41, and the air cleaner 15 is disposed in the opening. The upper portion of the air cleaner 15 (the air intake port 15*b*) is located higher than the front case 41. The air cleaner 15 is located in a substantially center position with respect to the vehicle body in the left-right direction, and is disposed between the left and right beam portions 23*f* (see FIG. 3B) of the frame front portion 20F. The various electric components 46*a* to 46*g* housed in the front case 41 are disposed so as to surround the air cleaner 15.

As shown in FIG. 4B, the radiator 31 is located below a front portion of the front case 41. The air cleaner 15 is located rearward of the radiator 31. The air cleaner 15 overlaps with the radiator 31 in the front view of the vehicle body.

As shown in FIG. 4B, the heat shield plate 26 is located below the front case 41. As described above, the heat shield plate 26 is offset upward with respect to the radiator 31. Therefore, the air flowing from the radiator 31 toward the dashboard 11 is blocked by the heat shield plate 26, and it is difficult for the air to flow obliquely rearward and upward. Therefore, the front case 41 can be prevented from being warmed by the air that receives the heat of the radiator 31, and as a result, the electric components 46*a* to 46*g* disposed on the front case 41 can be prevented from being warmed.

As shown in FIG. 6, the heat shield plate 26 is located frontward of the air cleaner 15. The heat shield plate 26 partially overlaps with the air cleaner case 15*a* in the front view of the vehicle body. Therefore, the air that receives the heat of the radiator 31 collides with the heat shield plate 26 before colliding with the air cleaner case 15*a*. Therefore, the air that receives the heat of the radiator 31 can be effectively prevented from reaching the electric components such as the meters 12.

[Gear Box]

Rotation output through the transmission 7*c* of the engine unit 7 is transmitted to the propeller shaft (not shown) extending forward from the transmission 7*c* and a drive shaft (not shown) extending laterally toward the front wheels 2. A gear box 18 (see FIG. 4A) is disposed between the arms 9L and 9U supporting the right front wheel 2 and the arms 9L and 9U supporting the left front wheel 2. A front end of the propeller shaft and a proximal portion of the drive shaft are connected to the gear box 18. The gearbox 18 is, for example, a housing of a differential gear. As shown in FIG. 4A, the radiator 31 and the heat shield plate 26 are located above the gear box 18.

[Overview]

(1) As described above, the vehicle 1 includes: the radiator 31 including the fan 31B; the driving seat 4 disposed rearward of the radiator 31; the dashboard 11 disposed rearward of the radiator 31 and frontward of the driving seat 4, and including the meters 12; the engine unit 7, at least a portion of which is located below the lower end 4*d* of the driving seat 4, and which is disposed further rearward than the front end 4*c* of the driving seat 4; and the heat shield plate 26 disposed between the radiator 31 and the dashboard 11. According to the vehicle 1, the heat shield plate 26 can easily prevent a device (for example, the electric component disposed on the dashboard 11) disposed rearward of the radiator 31 from being warmed by the air that receives the heat of the radiator 31.

(2) In the side view of the vehicle body, the heat shield plate 26 is inclined so as to extend obliquely rearward and downward from the upper edge 26*a* of the heat shield plate 26. Accordingly, the air that receives the heat of the radiator 31 can be effectively prevented from flowing obliquely upward toward the dashboard 11.

(3) The heat shield plate 26 has the area that is at least half of the area of the fan 31B of the radiator 31 in the front view of the vehicle. Accordingly, a sufficient area is secured in the heat shield plate 26, so that the air that receives the heat of the radiator 31 can be effectively prevented from reaching the dashboard 11.

(4) The distance from at least a part of the heat shield plate 26 to the radiator 31 is equal to or less than the diameter (R1×2) of the fan 31B of the radiator 31 in the side view of the vehicle. In this structure, since the distance between the heat shield plate 26 and the radiator 31 does not become too large, the air that receives the heat of the radiator 31 can be effectively prevented from reaching the dashboard 11.

(5) The distance from at least a part of the heat shield plate 26 to the radiator 31 is equal to or less than the radius R1 of the fan 31B of the radiator 31.

(6) At least a part of the heat shield plate 26 is located higher than the rotation center (the center line Ax1) of the fan 31B of the radiator 31. Accordingly, the air that receives the heat of the radiator 31 can be effectively prevented from flowing obliquely upward toward the dashboard 11.

(7) The heat shield plate 26 overlaps with the rotation center (the center line Ax1) of the fan 31B of the radiator 31 in the front view of the vehicle. Accordingly, the air discharged rearward from the fan 31B can be effectively shielded by the heat shield plate 26.

(8) The heat shield plate 26 is attached on the vehicle body frame 20. Accordingly, the fixture strength of the heat shield plate 26 can be sufficiently secured.

(9) The vehicle body frame 20 includes: the arm support portions 23L to which the proximal portions of the arms 9U and 9L of the right front wheel suspension device and the proximal portions of the arms 9U and 9L of the left front wheel suspension device are connected; and the left and right strut portions 23*e* extending upward from the arm support portions 23L. The heat shield plate 26 is attached on the left and right strut portions 23*e*. Accordingly, the fixture strength of the heat shield plate 26 can be sufficiently secured.

(10) The vehicle body frame 20 includes the upper cross portion 23*h* disposed along the upper edge 26*a* of the heat shield plate 26. Accordingly, the upper cross portion 23*h* can also function as a part of a heat shield member.

(11) A case (specifically, the air cleaner case 15*a*) is disposed frontward of the dashboard 11, and at least an upper portion of the heat shield plate 26 is located frontward of the case. Accordingly, since the air that receives the heat of the radiator 31 collides with the heat shield plate 26 before colliding with the case, it is possible to increase the distance that the air receiving the heat of the radiator 31 travels, before reaching the case.

(12) The heat shield plate 26 is disposed between the radiator 31 and the air cleaner case 15*a*. Accordingly, since the air that receives the heat of the radiator 31 collides with the heat shield plate 26 before colliding with the air cleaner case 15*a*, it is possible to increase the distance that the air receiving the heat of the radiator 31 travels, before reaching the case.

(13) At least a part of the heat shield plate 26 is located further rearward than the shock absorber 8 in the side view of the vehicle. Accordingly, it is possible to prevent the air that collides with the heat shield plate 26 and flows leftward or rightward from colliding with the shock absorber 8.

(14) The position of the upper edge 26a of the heat shield plate 26 may be the same as the position of the upper end 31a of the radiator 31, or lower than the upper end 31a of the radiator 31 and higher than the center line Ax1 of the radiator fan 31B.

(15) The heat shield plate 26 is located below the front case 41 in the side view of the vehicle body. Accordingly, it is possible to prevent the electric components 46a to 46g disposed in the front case 41 from being warmed by the air that receives the heat of the radiator 31.

(16) At least a part of the heat shield plate 26 may be located between the front fender 51 and the front wheel 2 in the side view of the vehicle body. Accordingly, the air that collides with the heat shield plate 26 can smoothly flow to the outside of the vehicle body from between the front fender 51 and the front wheel 2.

The vehicle 1 described above is merely an example of the structure proposed in the disclosure, and various modifications may be made.

For example, the structure proposed in the disclosure may be applied to a vehicle that has, as a front seat, only a driving seat disposed in a center of a vehicle body in the left-right direction.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A vehicle comprising:
a radiator including a fan;
a driving seat disposed rearward of the radiator;
a dashboard disposed rearward of the radiator and frontward of the driving seat, the dashboard including a meter;
an engine unit, at least a portion of which, is located below a lower end of the driving seat, and which is disposed further rearward than a front end of the driving seat; and
a heat shield plate disposed between the radiator and the dashboard; wherein the heat shield plate is located in a direction of the air flow through the radiator with regard to the radiator;
wherein the distance between a lower edge of the heat shield plate and a lower edge of the radiator is smaller than a diameter of the fan.

2. The vehicle according to claim 1, wherein, in a side view of a vehicle body, the heat shield plate is inclined to extend obliquely rearward and downward from an upper edge of the heat shield plate.

3. The vehicle according to claim 1, wherein the heat shield plate includes an area that is at least half of an area of the fan of the radiator in a front view of the vehicle.

4. The vehicle according to claim 1, wherein at least a part of the heat shield plate is located higher than a rotation center of the fan of the radiator.

5. The vehicle according to claim 1, wherein the heat shield plate overlaps with a rotation center of the fan of the radiator in a front view of the vehicle.

6. The vehicle according to claim 1, further comprising a vehicle body frame, wherein the heat shield plate is mounted on the vehicle body frame.

7. A vehicle comprising:
a radiator including a fan;
a driving seat disposed rearward of the radiator;
a dashboard disposed rearward of the radiator and frontward of the driving seat, the dashboard including a meter;
an engine unit, at least a portion of which, is located below a lower end of the driving seat, and which is disposed further rearward than a front end of the driving seat; and
a heat shield plate disposed between the radiator and the dashboard; wherein the heat shield plate is located in a direction of the air flow through the radiator with regard to the radiator;
further comprising a vehicle body frame, wherein the heat shield plate is mounted on the vehicle body frame;
further comprising left and right front wheel suspension devices, each including an arm supporting a front wheel so that the front wheels are vertically movable, wherein
the vehicle body frame comprising:
arm support portions to which a proximal portion of the arm of the right front wheel suspension device and a proximal portion of the arm of the left front wheel suspension device are connected, and
left and right strut portions extending upward from the arm support portions, and
wherein the heat shield plate is attached to the left and right strut portions.

8. A vehicle comprising:
a radiator including a fan;
a driving seat disposed rearward of the radiator;
a dashboard disposed rearward of the radiator and frontward of the driving seat, the dashboard including a meter;
an engine unit, at least a portion of which, is located below a lower end of the driving seat, and which is disposed further rearward than a front end of the driving seat; and
a heat shield plate disposed between the radiator and the dashboard; wherein the heat shield plate is located in a direction of the air flow through the radiator with regard to the radiator;
further comprising a vehicle body frame, wherein the heat shield plate is mounted on the vehicle body frame;
wherein the vehicle body frame includes a cross portion disposed along an upper edge of the heat shield plate.

9. The vehicle according to claim 1, wherein a case is disposed frontward of the dashboard, and
at least an upper portion of the heat shield plate is located frontward of the case.

10. The vehicle according to claim 1, further comprising an air cleaner disposed frontward of the dashboard, the air cleaner including a case provided with an intake port to suck air through the intake port from outside of the vehicle,
wherein the heat shield plate is disposed between the radiator and the case.

11. The vehicle according to claim 6, further comprising a front wheel suspension device including a shock absorber, wherein at least a part of the heat shield plate is located further rearward than the shock absorber in a side view of the vehicle.

12. The vehicle according to claim 1, wherein a position of an upper end of the heat shield plate is the same as a position of an upper end of the radiator, or lower than the upper end of the radiator and higher than a center of the fan of the radiator.

13. The vehicle according to claim 1, further comprising:
an electric component located frontward of the dashboard; and
a front case in which the electric component is disposed, wherein the heat shield plate is located below the front case in a side view of a vehicle body.

14. A vehicle comprising:
a radiator including a fan;
a driving seat disposed rearward of the radiator;
a dashboard disposed rearward of the radiator and frontward of the driving seat, the dashboard including a meter;
an engine unit, at least a portion of which, is located below a lower end of the driving seat, and which is disposed further rearward than a front end of the driving seat; and
a heat shield plate disposed between the radiator and the dashboard; wherein the heat shield plate is located in a direction of the air flow through the radiator with regard to the radiator;
further comprising:
a front wheel; and
a front fender, wherein at least a part of the heat shield plate is located between the front fender and the front wheel in a side view of a vehicle body.

* * * * *